United States Patent [19]

Hoge

[11] Patent Number: 4,843,721
[45] Date of Patent: Jul. 4, 1989

[54] MEASURING DEVICE

[75] Inventor: Charles Hoge, Redondo Beach, Calif.

[73] Assignee: Enerwest, Inc., Torrance, Calif.

[21] Appl. No.: 53,360

[22] Filed: May 22, 1987

[51] Int. Cl.⁴ .............................................. G01B 3/20
[52] U.S. Cl. ..................................................... 33/802
[58] Field of Search ............ 33/168 R, 168 B, 178 B, 33/147 R, 147 F, 143 R, 143 J, 143 K, 143 L, 143 M

[56] References Cited

U.S. PATENT DOCUMENTS

| | | | |
|---|---|---|---|
| 1,342,288 | 6/1920 | Ichiba | 33/143 M |
| 2,034,804 | 3/1936 | Gamroth | 33/147 T |
| 2,200,479 | 5/1940 | Sisson et al. | 33/147 F |
| 4,138,820 | 2/1979 | O'Connor | 33/168 R |

FOREIGN PATENT DOCUMENTS 2481441 10/1981 France ............................ 33/143 J
0024983 of 1908 United Kingdom .............. 33/147 F Primary Examiner—Harry N. Haroian
Attorney, Agent, or Firm—Poms, Smith, Lande & Rose

[57] ABSTRACT

Disclosed herein is a measuring device with a rotary visually readable dial for determining discrete measurements of linear displacement between the finger caliper and the indexing caliper jaws of the measuring device. A gauge slide bar provides a rack which drives a set of gears. One of the gears in the gear train is spur gear which is mounted to the rotary indicia bearing dial, so that as the gauge bar slide reciprocates within the compartment formed by the caliper cover and base, the indexing caliper linear displacement is tracked by the indicia provided on the rotary dial for both English and metric measurement.

Also shown is a one piece card which defines an aperture formed into a staircase pattern to discretely define varying sizes of nuts or bolt heads.

10 Claims, 2 Drawing Sheets

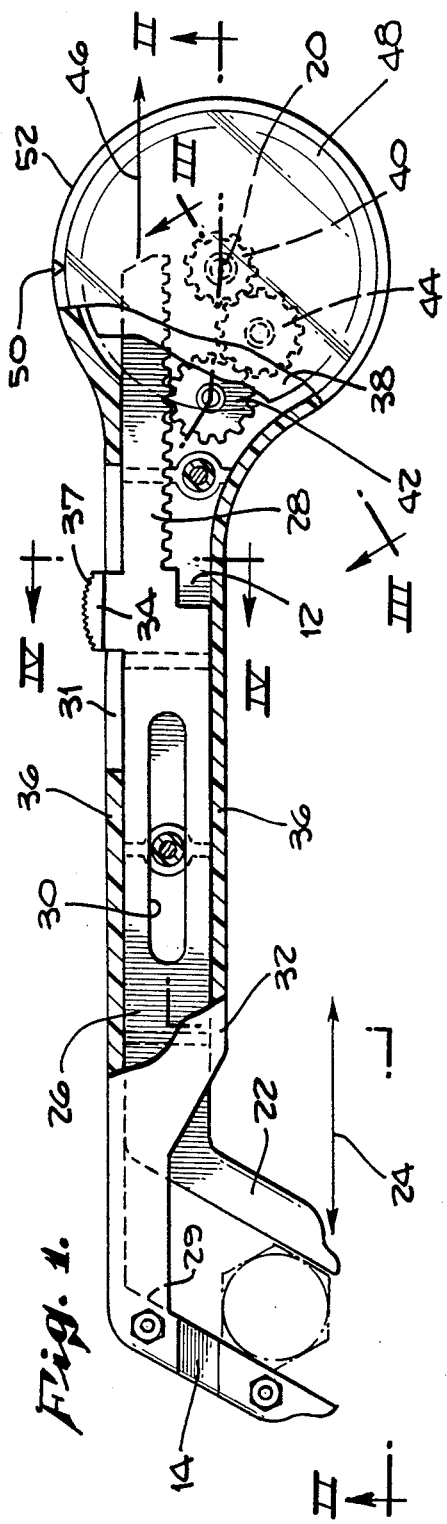
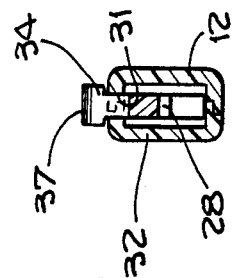
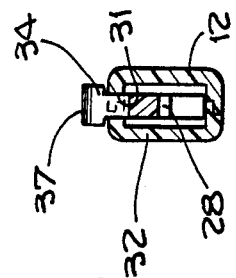
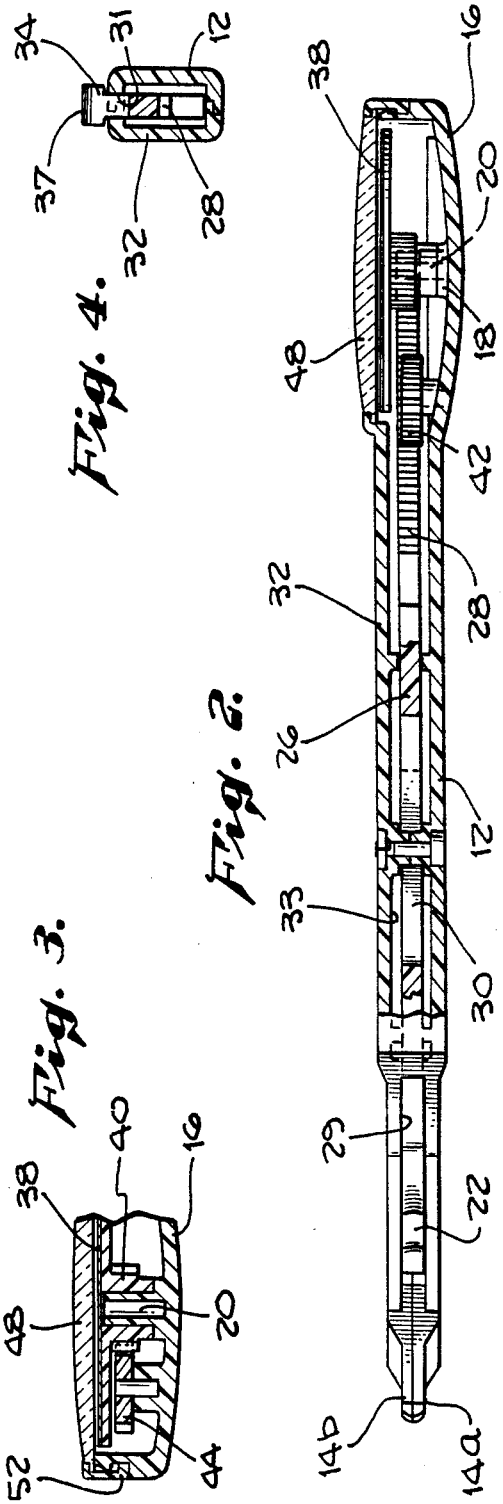

MEASURING DEVICE

FIELD OF THE INVENTION

This invention relates to linear measuring tools and in particular this invention relates to the field of tools for measuring the size of nuts and bolt heads.

BACKGROUND OF THE INVENTION

In the field of vehicular and mechanical repair, it is becoming increasingly common for a skilled mechanic to encounter the need to repair a vehicle or other equipment for a customer which have components made according to both metric and English measurement standards. In particular, many of today's automobiles have both nuts and bolts measured in fractions of inches as well as securement screws measured in millimeters. Often, the skilled mechanic must work in an area that is difficult to reach and even out of view. When it becomes necessary to adjust or loosen a particular nut attached to a particular bolt, the mechanic must know the size of the particular nut which he is adjusting in order to select the proper wrench to perform proper servicing of the vehicle or equipment.

Heretofore, a system of trial and error has been undertaken by a mechanic in such a predicament where he is not sure of the size of a nut secured to a bolt. In place of trial and error, the mechanic may turn to a repair manual published by the manufacturer, but often every nut and bolt is not accurately listed in such a manual according to its size.

One manner of solving the dilemma which such a skilled mechanic often finds himself would be to physically measure the diameter of a nut before providing a wrench to the nut in order to loosen a particular joint in question. Among the direct measuring devices available include an internal micrometer and extension rod which allows measurements to be estimated to one ten-thousandth of an inch. Such an internal micrometer has a vernier scale engraved on its barrel. While this micrometer is useful for precise measurement, it does not easily provide information to the mechanic as to the particular size of a nut. For example, in the English system, most nuts and bolts are measured in increments of sixteenths (or thirty-secondths) of an inch (1/16 or 1/32 inch). Such measurements do not easily translate to a decimal measurement provided by a micrometer. Also, such a micrometer is not easily manipulated by one hand in an area out of easy view on the underside of an automobile.

Likewise, if one were to use a vernier caliper to accomplish the sizing and measurement of a particular nut screwed to a particular bolt, one would not easily be able to manipulate such a caliper instrument in hard to reach places. A vernier caliper is characterized by a carriage device which rides a linear scale along a fixed elongated ruler. This carriage provides a viewing window for viewing the linearly displayed indicia. The carriage has an indexing caliper which forms a jaw with the ruler's fixed caliper. Fine adjustment is made by a screw which is mounted parallel to the line of movement of the carriage caliper. As with the internal micrometer, the vernier may give precise measurements to decimal portions of an inch, but does not easily translate to the fractional sizes common in English-measured nuts.

It appears, therefore, that micrometers and vernier calipers may provide precise measurement that is not particularly useful to solve the problem of determining the size of a standard nut which is collaring a bolt. Measurements to the ten-thousandth of an inch simply represent an overkill and go beyond the scope of what is needed to solve the problem that the skilled mechanic regularly faces.

It is an object of this invention to provide a linear measuring device which accurately indicates to a user the size of a nut which surrounds a bolt in a form of measurement which is easily recognizable according to the standards of both the English and metric systems, and helps to indentify whether an unknown nut is English or metric.

It is also an object of this invention to provide a hand measuring tool which is easily held and manipulated by one hand for placement in hard to reach or low visibility areas in order to make a measurement and a determination as to a particular size of an object.

SUMMARY OF THE INVENTION

A measuring device is disclosed which provides a mechanism for determining the size of a particular nut or a particular bolt head.

The measuring device of the preferred embodiment of this invention has a rotary indicia bearing dial mounted into the body of this caliper. The indicia bearing dial has a scale for both English and metric sizes of nuts, so that as the calipers form a jaw about the nut to be measured, an indication is provided on the rotary dial at the head of the caliper indicative of the size of the outer diameter of the measured nut.

The measuring device of the preferred embodiment of this invention comprises elongated base having an outwardly extending finger caliper at one end and a pod defined at a second end. The base has a plurality of securement posts and a longitudinally extending guide track. The indicia bearing dial resides within the pod. A cover member, which is substantially a mirror image of the elongated base, is mated to the elongated base and together they form an encasement compartment into which a reciprocally mounted gauge bar slide is sandwiched therebetween. The gauge bar slide is seated within a longitudinally extending guide track of the base. The gauge bar slide has a drive engagement assembly at one end and an indexing caliper mounted adjacent the finger caliper of the base at a second end. An elongated slot is provided at the central portion of the reciprocally mounted gauge bar to receive one of the securement posts of the base so that the gauge bar slide may reciprocally move within the casing formed by the base and the cover member. The drive engagement means may, in the preferred embodiment, comprise a toothed rack assembly. An operator may manipulate and engage the gauge bar slide for movement by a thumb engagement switch which laterally extends from one side of the bar slide.

In the preferred embodiment, the thumb engagement switch is a protrusion having a serrated edge which sticks laterally outward from the slide bar through a slot, through the encasement compartment formed by the cover member and the base, allowing an operator to manually manipulate the longitudinal movement of the gauge bar slide reciprocally within the encasement compartment.

The dial may be driven by a plurality of spur gears, one of which engages the rack of the bar slide as a pinion; while at least one of the spur gears is integrally mounted to the underside of the indicia bearing dial, so that, as this gear is turned by movement of the bar slide, the indicia bearing dial rotates a distance which is proportional to a known amount of relative movement between the finger caliper and the indexing caliper.

Alternatively, the measuring device of this invention may be a one piece card which defines an increasingly widening space for receiving a nut to be measured. The increasingly widening spaced-section of the card may be in the form of a staircase pattern where each step of the staircase defines a different nut size.

BRIEF DESCRIPTION OF THE DRAWINGS

FIG. 1 shows a top partially cross sectioned plan view of the preferred embodiment of the nut measuring device of this invention.

FIG. 2 shows a cross sectional view of the measuring device of this invention taken along lines II—II of FIG. 1.

FIG. 3 shows a cross sectional view taken along line III—III of FIG. 1.

FIG. 4 is a cross sectional view taken along line IV—IV of FIG. 1.

DETAILED DESCRIPTION OF THE INVENTION

Figure 5:
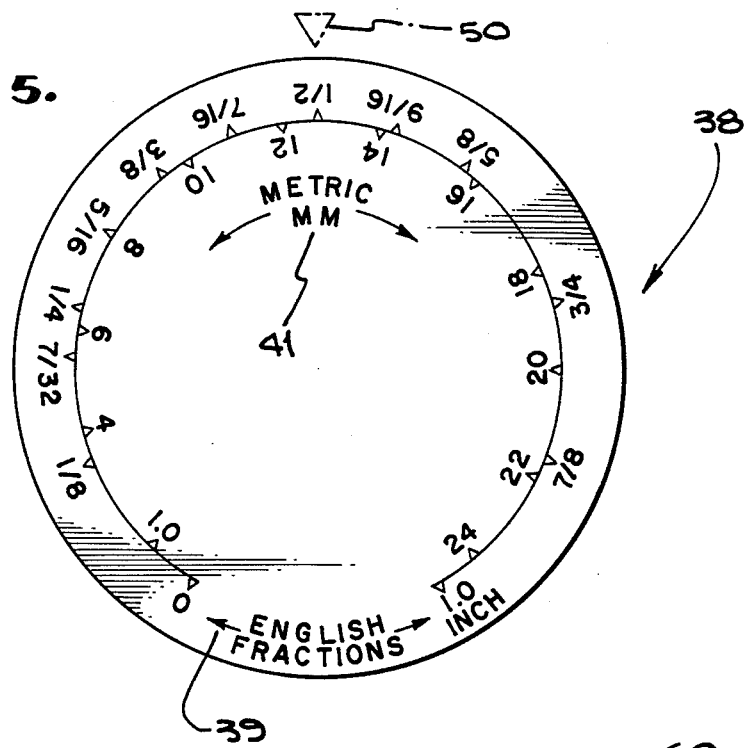
FIG. 5 is a fragmentary plan view of the indicia bearing dial mounted within the head of the measuring device of this invention.

With reference to FIGS. 1 and 2, a measuring device 10 is shown generally. The measuring device includes an elongated base 12, which base 12 has a finger caliper 14 at one end and a circular pod 16 (FIG. 2) at the other end. FIG. 2 shows that the pod 16 provides a mounting aperture site 18 within the pod 16 for securely positioning a securement post 20 (see FIG. 3) therein.

A reciprocally mounted gauge bar slide 26 has an indexing caliper 22, and the bar slide 26 is slidably adjustable for movement in a reciprocal fashion along line 24 as shown in FIG. 1. The indexing caliper 22 is positioned adjacent the finger caliper 14 of the base 12. The gauge bar slide 26 includes the indexing caliper 22 at one end, and a toothed rack 28 at the other end. In the central portion of the reciprocally mounted gauge bar slide 26, an elongated slot 30 allows the gauge bar slide 26 to move reciprocally in a longitudinal direction 24 within the compartment 33 formed by the elongated base 12 and the cover member 32. The cover member 32 is substantially a mirror image of the base 12 from the slot 30 down to the finger caliper 14. FIG. 2 shows that the finger caliper 14 is formed by a sandwiched arrangement of caliper portions 14a and 14b.

Sliding operational movement of the bar slide 26 is provided by the laterally extended thumb engagment switch 34 which has a serrated protruding edge 37. As one activates the switch 34, longitudinal movement of the bar slide 26 is initiated moving the indexing caliper 22 relative to the finger caliper 14. It will be noted that the elongated cover member 32 and the elongated base 12 form a pair of guide rails 36 which assure that the gauge bar slide 26 reciprocates within the encasement compartment 33 formed by the cover member 32 and the elongated base 12. Along the longitudinal edge of the compartment 33 is a elongated slot 29 through which the indexing Caliper 22 protrudes. The compartment 33 also defines thumb switch slot 31 through which the switch 34 protrudes.

FIG. 4 shows a cross-sectional view of the switch 34 mechanism as the rack 28 rides within the encasement compartment 33 formed by the base 12 and cover 32. The base 12, cover 32, and gauge bar slide 26 may be made from ABS plastic material.

FIG. 5 reveals an indicia bearing dial 38 (the indicia being secured to the moveable dial) which (for purposes of illustration) has indicia relating to both the English and metric systems of linear measurement. The indicia is uniquely scored in one-sixteenth or one-thirty-second of an inch fractions in the English system (39) in order to correspond to the various sizes of nuts that need to be engaged by work wrenches. Likewise, the metric indicia 41 is discretely scored to encompass each change in size of a metric nut diameter.

The indicia bearing dial 38 is integrally mounted upon a spur gear 40 and together the dial 38 and gear 40 rotate about a securement post 20. The rack 28 of the bar slide 26 (when the bar slide 26 is activated by switch 34) may directly engage the spur gear 40 (which gear 40 acts as a pinion) and cause the rotary indicia bearing dial 38 to be turned (not shown). In the preferred embodiment, however, three separate gears have been selected for use in a gear train formation so that a drive gear 42 engages the rack 28 as a pinion, while the spur gear 40, affixed to the indicia bearing dial 38, is driven by an intermediate gear 44; which gear 44, in turn, is driven by the spur gear 42. Operation of the gear 44 in contact with gear 40 (riding on post 20) is shown in cross-section in FIG. 3. Whether a single gear engages the rack 28 of the bar slide 26, or a gear train (as in the preferred embodiment) is used, the linear displacement of the indexing caliper 22 relative to the finger caliper 14 is proportional to a predetermined rotation of the indicia bearing dial 38. The gears 40, 42, and 44 may be made from nylon material.

As shown in FIGS. 1 and 2, the bar slide 26 is allowed to reciprocate within the compartment formed by the cover member 32 and the elongated base 12 without protruding longitudinally outward in the direction of arrow 46 out beyond the head of the base 12. Thus, the gear train is used to provide motion to the rotary dial 38 and the gauge bar slide 28 at two different locations. In the preferred embodiment, the pitch of the spur gears are precisely set to provide a proportional movement of the dial 38 that is related to linear displacement of the indexing caliper 22 from the finger caliper 14.

In this manner, a preferred embodiment of a measuring device which may be useful for measuring the discrete sizes of bolt nuts is disclosed. A clear plastic cover 48 (FIG. 2) may be secured by a snap fitting to the top head frame 52 of the pod 16, thereby providing a viewing window for reading of the indicia bearing dial 28. Relative movement of the dial 38 is indicated with reference to the scored indicator 50 positioned on the head frame 52.

Figure 6:
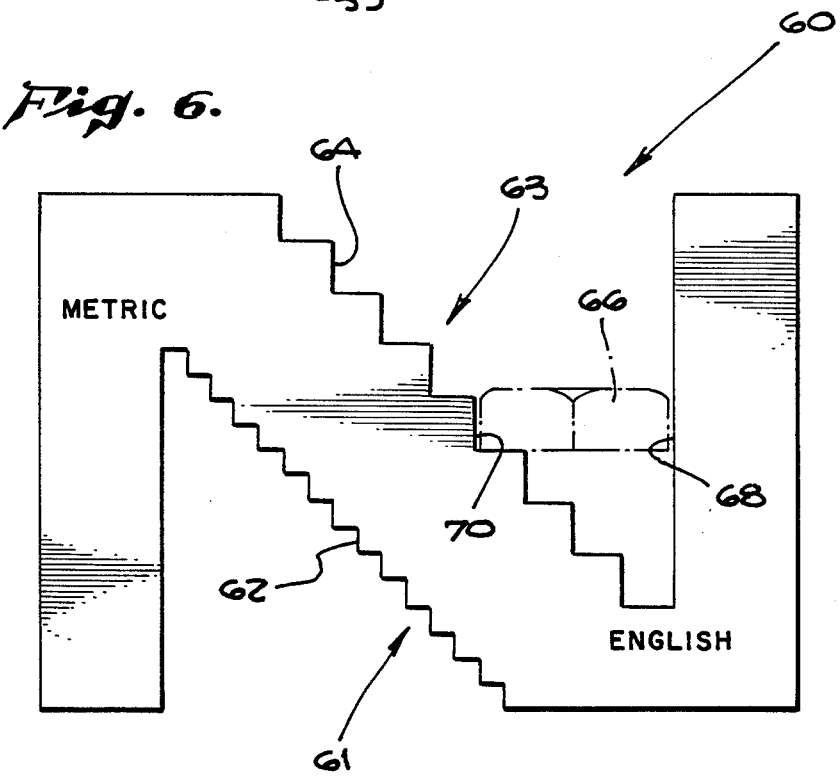
FIG. 6 shows an alternative one-piece card nut measuring device of this invention.

Yet another alternative embodiment is shown in FIG. 6. A card 60 is shown generally which defines a set of nut receiving apertures 61 bounded by staircase pattern 62 and a set of nut receiving apertures 63 bounded by staircase pattern 64. For purposes of illustration, a nut 66 is placed between the vertical border 68 and the step 70, enabling the user to determine the outer diameter nut size of the nut 66. As one can see, the smaller the nut size, the further into the card the nut will be positioned. The zig-zag staircase patterns 62 and 64 each define a set of increasingly smaller discrete spaces corresponding to increasingly smaller nut sizes. The card 60 may be manufactured from plastic or thin sheet aluminum and is preferably on a thickness in the range of 1/16-⅛ inch thick.

Although a preferred embodiment has been disclosed, it is noted that other embodiments alternatively may be deemed to be within the scope of this invention. For example, the rack and pinion design for driving the rotating measuring dial 28 may be replaced by a belt and pulley arrangement. This alternative embodiment and other equivalent designs are intended to be within the scope of the appended claims hereto.

What is claimed is:

1. A measuring device, comprising:
    means for indicating the size of a nut, said indicating means including a moveable indexing caliper and a finger caliper positioned a fixed distance about either side of said nut and means for providing nut size information corresponding to the fixed distance between said finger caliper and said indexing caliper;
    an elongated base having said finger caliper at one end and a circular pod defined at a second end;
    said base having a plurality of mounted securement posts and a longitudinally extended guide track;
    an indicia bearing dial mounted into said pod;
    a reciprocally mounted gauge bar slide, seated within said longitudinally extending guide track of said base, having a drive engagement means at one end, said indexing caliper mounted adjacent said finger caliper of said base at a second end, and means for receiving one of said securement posts of said base;
    said gauge bar slide having means for manual engagement laterally extended from one side of said bar slide; and,
    drive means for simultaneously linearly displacing said reciprocally mounted gage bar slide and rotating said indicia bearing dial, said indicia bearing dial rotating a distance proportional to the linear displacement of said bar slide;
    whereby, said indicia bearing dial may indicate the distance between the indexing caliper of said bar slide and the finger caliper of said base.

2. The measuring device of claim 1, including:
    an elongated cover member, having an outwardly extending second finger caliper at one end which matches the finger caliper of said elongated base forming an encasement compartment with said base; and, wherein:
    said cover member defines a circular frame at a second end for receiving said indicia bearing dial.

3. The measuring device of claim 2, wherein:
    said cover member also includes a transparent viewing window mounted within said circular frame, whereby, said indicia bearing dial may be viewed.

4. The measuring device of claim 1, wherein:
    said drive means for simultaneously linearly displacing said reciprocally mounted gauge bar slide and rotating said indicia bearing dial further comprises:
    a plurality of spur gears, at least one of said gears integrally mounted under said indicia bearing dial and rotating with said dial;
    and at least one of said spur gears being driven by said drive engagement means of said bar slide.

5. The measuring device of claim 4, wherein:
    said drive engagement means comprises a toothed rack means for engaging at least one of said spur gears, one of said spur gears being a pinion driven by said toothed rack of said drive engagement means.

6. The measuring device of claim 1, wherein:
    said means for receiving one of said securement posts of said base includes a countersunk aperture for vertically positioning a securement post; and,
    one of said spur gears is integral with said indicia bearing dial; so that, said spur gear integral with said dial may be mounted on said post.

7. The measuring device of claim 1, wherein:
    said means for manual engagement of said gauge bar slide is a toothed thumb engagment switch having a serrated edge which protrudes laterally outward from said bar slide,
    whereby said reciprocally mounted gauge bar slide may be longitudinally displaced.

8. A measuring device comprising:
    an elongated base having an outwardly extending first finger caliper at one end, a circular pod to find at a second end, and a central region defining a plurality of apertured mountings sites;
    an elongated cover having an outwardly extending second finger caliper at one end and a circular frame, defined by the circumference of said circular pod of said elongated base;
    said cover defining a perimeter which is suitable for a matched mounting upon said base, said base and said cover member defining a longitudinal slot midway between them at the interface of their respective perimeters when said cover and said base are fitted together;
    said elongated base and said cover defining along their respective longitudinal sides a pair of guide rails;
    a reciprocally mounted gauge bar slide, sandwiched between said base and said cover member, seated within said longitudinally extending guide rails of said base, having:
    a drive engagement means at one end,
    an indexing caliper mounted adjacent said finger caliper of said base at a second end, and
    an elongated slot in a central portion of said bar slide for receiving at least one of a plurality of securement posts mounted within said apertures of said base;
    said gauge bar slide having a serrated protruding portion laterally extended from one side of said bar slide;
    an indicia bearing dial means for indicating the distance between said indexing caliper of said bar slide and said first and second finger calipers; and,
    drive means for simultaneously linearily displacing said reciprocally mounted gauge bar slide and rotating said indicia bearing dial means,
    whereby, said indicia bearing dial means rotates a distance proportional to the linear displacement of said bar slide.

9. The measuring device of claim 8, wherein:
    said drive means includes a plurality of spur gears, at least one of which is integral with said indicia bearing dial means;
    one of said spur gears being driven by said drive engagement means of said bar slide.

10. A measuring device as in claim 9 wherein said drive engagement means comprises:
    a toothed rack which engages one of said spur gears;
    whereby, said rack and said spur gear form a rack and a pinion drive.

* * * * *